United States Patent
An et al.

(10) Patent No.: US 10,303,957 B2
(45) Date of Patent: May 28, 2019

(54) VEHICLE CONTROL SYSTEM BASED ON USER INPUT AND METHOD THEREOF

(71) Applicant: HYUNDAI MOTOR COMPANY, Seoul (KR)

(72) Inventors: Jun Sik An, Anyang-si (KR); Eu Gene Chang, Gunpo-si (KR); Joong Ryoul Lee, Yeonsu-gu (KR); Kap Je Sung, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 123 days.

(21) Appl. No.: 15/345,132

(22) Filed: Nov. 7, 2016

(65) Prior Publication Data

US 2017/0344837 A1    Nov. 30, 2017

(30) Foreign Application Priority Data

May 26, 2016 (KR) .................. 10-2016-0064923

(51) Int. Cl.
| | |
|---|---|
| *G06K 9/00* | (2006.01) |
| *G06K 9/20* | (2006.01) |
| *G06T 11/60* | (2006.01) |
| *H04N 5/232* | (2006.01) |
| *G06T 7/73* | (2017.01) |
| *G06T 7/246* | (2017.01) |
| *B60K 35/00* | (2006.01) |
| *B60R 1/00* | (2006.01) |
| *G06F 3/0488* | (2013.01) |

(52) U.S. Cl.
CPC ....... *G06K 9/00805* (2013.01); *G06K 9/2081* (2013.01); *G06T 7/248* (2017.01); *G06T 7/74* (2017.01); *G06T 11/60* (2013.01); *H04N 5/23293* (2013.01); *B60K 35/00* (2013.01); *B60K 2350/1028* (2013.01); *B60R 1/00* (2013.01); *G06F 3/0488* (2013.01); *G06T 2207/30261* (2013.01)

(58) Field of Classification Search
None
See application file for complete search history.

(56) References Cited

U.S. PATENT DOCUMENTS 9,201,424 B1 * 12/2015 Ogale .................. G06T 7/80
2012/0170812 A1    7/2012 Kamiyama
2013/0010118 A1    1/2013 Miyoshi et al.
(Continued)

FOREIGN PATENT DOCUMENTS

| JP | 2012-156903 A | 8/2012 |
| JP | 2013-093865 A | 5/2013 |
(Continued)

OTHER PUBLICATIONS

Office Action issued in corresponding Korean Patent Application No. 10-2016-0064923, dated Aug. 29, 2017.

*Primary Examiner* — Wei Wen Yang
(74) *Attorney, Agent, or Firm* — Morgan, Lewis & Bockius LLP (57) ABSTRACT

A vehicle control system based on a user input includes: a user information input device receiving a region of interest from a user; a vehicle movement information calculator calculating movement information of a vehicle; and a vehicle position relationship tracker performing a vehicle control based on the region of interest and the movement information of the vehicle.

12 Claims, 11 Drawing Sheets

(56) References Cited

U.S. PATENT DOCUMENTS

| | | | | |
|---|---|---|---|---|
| 2014/0112542 A1* | 4/2014 | Choi | ............ | G06K 9/00812 |
| | | | | 382/104 |
| 2014/0309870 A1* | 10/2014 | Ricci | ............ | H04W 4/21 |
| | | | | 701/36 |
| 2016/0176372 A1* | 6/2016 | Kim | ............ | E05F 15/73 |
| | | | | 701/49 |
| 2016/0185294 A1 | 6/2016 | Miyoshi et al. | | |
| 2017/0305418 A1* | 10/2017 | Bae | ............ | B60W 50/0098 |

FOREIGN PATENT DOCUMENTS

| | | |
|---|---|---|
| JP | 5240149 B2 | 7/2013 |
| JP | 5408198 B2 | 2/2014 |
| JP | 2014-043140 A | 3/2014 |
| JP | 5503660 B2 | 5/2014 |
| JP | 5518407 B2 | 6/2014 |
| KR | 10-2014-0004409 A | 1/2014 |
| KR | 10-1446897 B1 | 10/2014 |
| KR | 10-1613849 B1 | 4/2016 |

\* cited by examiner

<Camera Model>

VEHICLE CONTROL SYSTEM BASED ON USER INPUT AND METHOD THEREOF

CROSS-REFERENCE TO RELATED APPLICATION

This application is based on and claims the benefit of priority to Korean Patent Application No. 10-2016-0064923, filed on May 26, 2016 in the Korean Intellectual Property Office, the disclosure of which is incorporated herein in its entirety by reference.

TECHNICAL FIELD

The present disclosure relates to a vehicle control system based on a user input and a method thereof, and more particularly, to a technology of performing a vehicle control by applying region of interest information input by a user.

BACKGROUND

In accordance with the development of a sensor technology such as a ultrasonic sensor, a camera, radar, or the like, various advanced driver assistance systems (ADAS) such as an automatic parking system, a parking assistance system, and the like that perform a vehicle control or provide a warning by recognizing obstacles around a vehicle are mounted in the vehicle.

Such ADAS controls or guides the vehicle to allow the vehicle to avoid a collision by recognizing the obstacles or surrounding vehicles. Since some obstacles (e.g., a curbstone, a puddle, etc.) may have a low height, some obstacles (e.g., a barbed-wire fence) may be difficult to be recognized on characteristics of the sensor, and some obstacles such as a waterway or a slope way may be impossible to be recognized by the sensor, and in addition, since dangerous regions may not be recognized by an existing ultrasonic sensor, there is a problem that accident likelihood exists when these obstacles and dangerous regions exist on a path of the vehicle.

SUMMARY

The present disclosure has been made to solve the above-mentioned problems occurring in the prior art while advantages achieved by the prior art are maintained intact.

An aspect of the present disclosure provides a vehicle control system based on a user input and a method thereof capable of performing a safe and accurate vehicle control and increasing convenience of a user by receiving information on obstacles or dangerous regions visually recognized by the user and a position relationship with other vehicles from the user and applying the received information to the vehicle control.

However, objects of the present disclosure are not limited to the objects described above, and other objects that are not described above may be clearly understood by those skilled in the art from the following description.

According to an exemplary embodiment of the present disclosure, a vehicle control system based on a user input includes: a user information input device receiving a region of interest from a user; a vehicle movement information calculator calculating movement information of a vehicle; and a vehicle position relationship tracker performing a vehicle control based on the region of interest and the movement information of the vehicle.

The vehicle control system may further include an image coordinate converter converting an image coordinate of the region of interest received from the user into a world coordinate.

The image coordinate converter may calculate a world coordinate for a position of the vehicle and a world coordinate of the region of interest after the vehicle is moved by adding the movement information of the vehicle to the world coordinate for the position of the vehicle and the world coordinate of the region of interest.

The vehicle position relationship tracker may control the vehicle by comparing a relative distance between the world coordinate for the position of the vehicle and the world coordinate of the region of interest after the vehicle is moved.

The vehicle position relationship tracker may perform a control to avoid a collision between the vehicle and the region of interest.

The region of interest may include obstacles which are not sensed by a sensor.

The vehicle control system may further include an image obtainer obtaining image data around the vehicle.

The user information input device may display the image data obtained by the image obtainer on a screen, and receive the region of interest by a touch of a user among the image data displayed on the screen.

The vehicle control system may further include an image synthesizer synthesizing front, rear, and side images of the vehicle from the image data of the image obtainer.

The user information input device may display the image data synthesized by the image synthesizer on a screen, and receive the region of interest by a touch of a user among the image data displayed on the screen.

According to another exemplary embodiment of the present disclosure, a vehicle control method based on a user input includes: displaying image data around a vehicle on a screen; designating, by an input from a user, a region of interest on the displayed screen; and performing a vehicle control by applying the region of interest. In the displaying of the image data on the screen, front, rear, and side image data of the vehicle may be synthesized and be displayed.

In the designating of the region of interest, the region of interest may be received by a touch or drag manner on the screen.

In the designating of the region of interest, an image coordinate of the region of interest may be converted into a world coordinate.

The performing of the vehicle control by applying the region of interest may include: calculating movement information of the vehicle; and performing the vehicle control according to a distance between the region of interest and the vehicle by considering the movement information of the vehicle.

The performing of the vehicle control by applying the region of interest may further include warning a collision by comparing a distance between the region of interest and the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some exemplary embodiments of the present disclosure will be described in detail with reference to the illustrative drawings. It is to be noted that in giving reference numerals to components of each of the accompanying drawings, the same components will be denoted by the same reference numerals even though they are shown in different drawings. Further, in describing exemplary embodiments of the present disclosure, well-known constructions or functions will not be described in detail in the case in which they may unnecessarily obscure the understanding of the exemplary embodiments of the present disclosure.

In describing the components of exemplary embodiments of the present disclosure, terms such as first, second, A, B, (a), (b), etc. can be used. These terms are used only to differentiate the components from other components. Therefore, the nature, order, sequence, etc. of the corresponding components are not limited by these terms. In addition, unless defined otherwise, it is to be understood that all the terms used in the specification including technical and scientific terms have the same meaning as those that are understood by those skilled in the art. It should be understood that the terms defined by the dictionary are identical with the meanings within the context of the related art, and they should not be ideally or excessively formally construed unless clearly defined otherwise in the present application.

The present disclosure discloses a technology of performing a vehicle control by taking account of regions of interest when image information around a vehicle is provided to a screen and a user inputs the regions of interest (e.g., obstacles, dangerous regions, etc.) onto the screen.

Hereinafter, exemplary embodiments of the present disclosure will be described in detail with reference to FIGS. 1 to 8.

Figure 1:
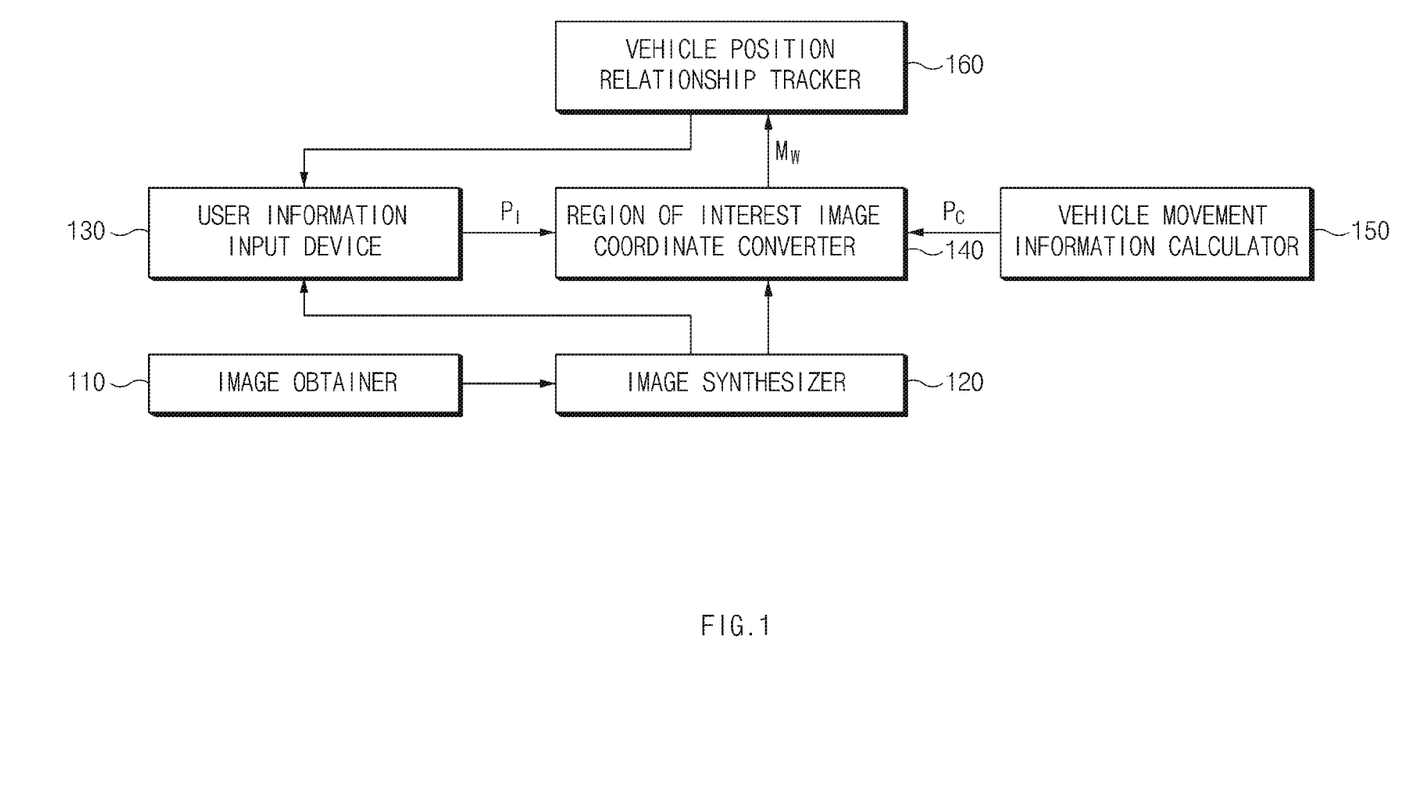
FIG. 1 is a configuration diagram of a vehicle control system based on a user input according to an exemplary embodiment of the present disclosure.

FIG. 1 is a configuration diagram of a vehicle control system based on a user input according to an exemplary embodiment of the present disclosure.

The vehicle control system based on a user input according to an exemplary embodiment of the present disclosure includes an image obtainer 110, an image synthesizer 120, a user information input device 130, an image coordinate converter 140, a vehicle movement information calculator 150, and a vehicle position relationship tracker 160.

The image obtainer 110 obtains an image around a vehicle. In this case, the image obtainer 110 may include cameras disposed in a front, a rear, and a side of the vehicle.

Figure 3A:
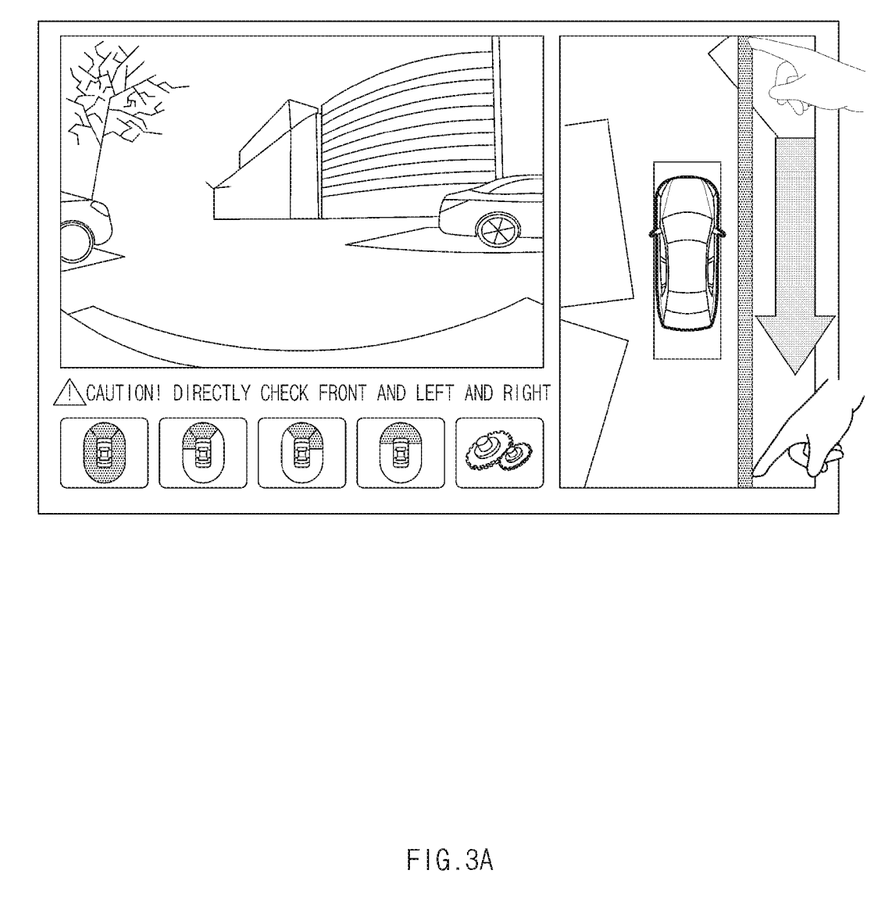
FIG. 3A is an illustrative view of a screen for a user input according to an exemplary embodiment of the present disclosure.

The image synthesizer 120 synthesizes a plurality of images obtained by the image obtainer 110 to thereby configure a screen as in FIG. 3A, for example. In this case, FIG. 3A illustrates a screen obtained by expanding an image showing the rear of the vehicle as a main portion of the screen, and illustrates another image showing around the vehicle at the right side of the screen. In this case, the synthesized image is not limited to the screen illustrated in FIG. 3A, but may be variously configured according to convenience of a user.

Figure 3B:
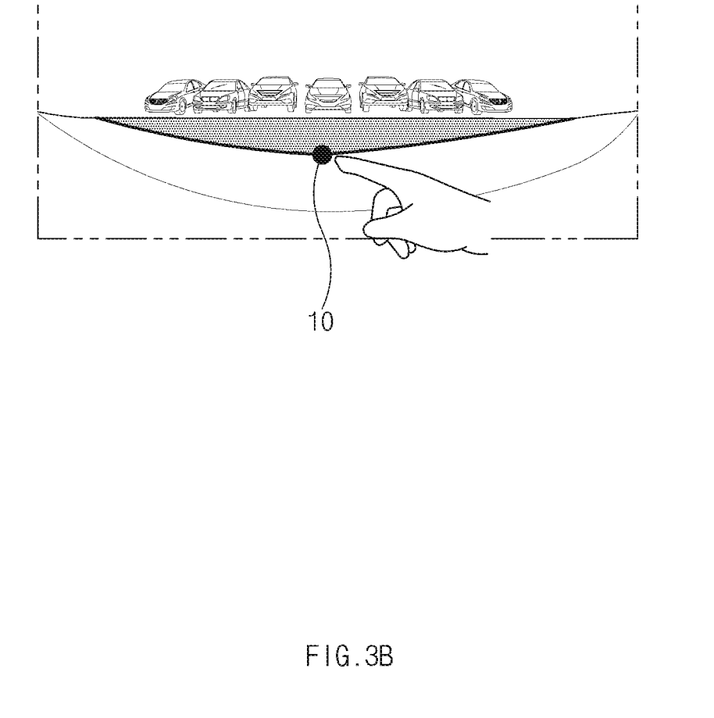
FIG. 3B is an illustrative view of a user input through an input point according to an exemplary embodiment of the present disclosure.
Figure 3C:
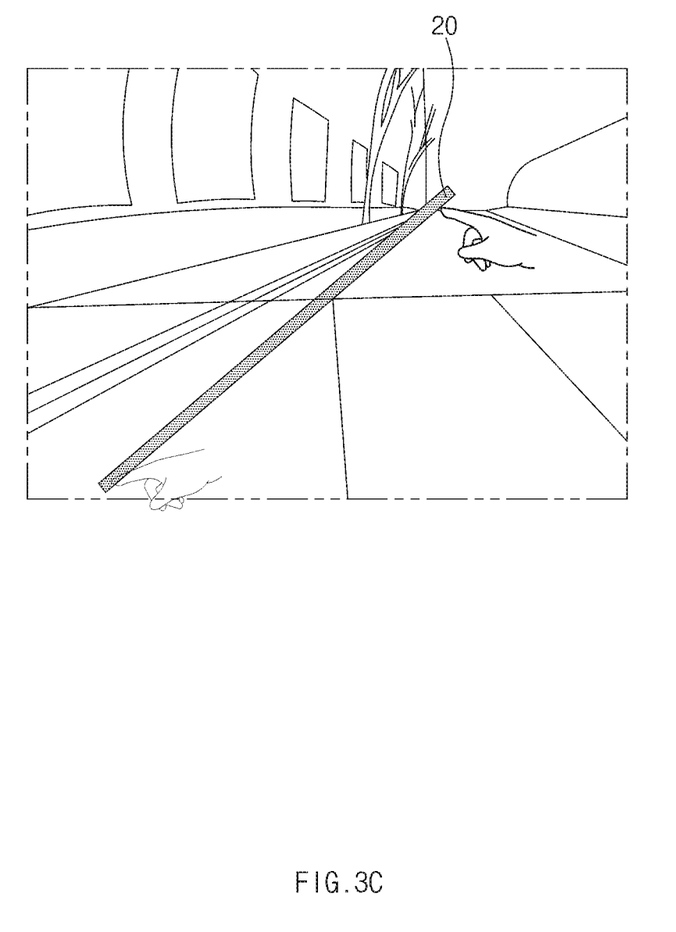
FIG. 3C is an illustrative view of a region of interest setting through the user input according to an exemplary embodiment of the present disclosure.

The user information input device 130 may receive a region of interest through a region touch among an image which is synthesized by the image synthesizer 120 and is displayed or the images which are obtained by the image obtainer 110 but are not synthesized. Here, the user information input device 130 may be implemented so as to display the screen as a touch display such as a touch pad, a touch screen, or the like and to receive a touch of a user. In addition, the regions of interest may include obstacles having a low height (e.g., a curbstone, a puddle, etc.) which are difficult to be detected by an ultrasonic sensor, a radar sensor, or the like, an obstacle (e.g., a barbed-wire fence) which is difficult to be recognized on characteristics of the sensor, or a dangerous region such as a waterway, a slope way, or the like. FIG. 3B is an illustrative view of a user input through an input point according to an exemplary embodiment of the present disclosure and FIG. 3C is an illustrative view of a region of interest setting through the user input according to an exemplary embodiment of the present disclosure. That is, FIG. 3B, which is an example in which a target position at the time of reversing the vehicle is arbitrarily changed by the user input, displays a distance with a point selected as a point coordinate input 10 in an image. FIG. 3C illustrates an example in which the user sets an obstacle 20 of which a position is confirmed by a camera image such as the curbstone, the waterway, the slope way, or the like, but which is difficult to be detected by the sensor, as a region of interest.

The image coordinate converter 140 converts position information input by the user through the user information input device 130 into a world coordinate and generates a virtual obstacle.

In this case, an input image coordinate of the region of interest input through the user information input device 130 is defined as $P_I(I_x, I_y)$, and the above-mentioned image coordinate means a bundle of neighboring several pixel coordinates, not one coordinate. The world coordinate of the region of interest obtained by calculating the above-mentioned input image coordinate $P_I$ by a camera model is $P_w(W_x, W_y, W_z=0)$, which becomes the world coordinate of $P_I$ calculated in a state in which it is assumed that $P_c$ is an origin point.

In addition, a world coordinate of the vehicle is $P_c(C_x, C_y, C_z=0)$, an interior of a quadrangle formed by connecting four coordinates corresponding to the respective corners of the vehicle in relation to a position of the vehicle at the time of a user input is set as the world coordinate of the vehicle, and the above-mentioned world coordinate may be updated according to a movement of the vehicle.

Figure 6:
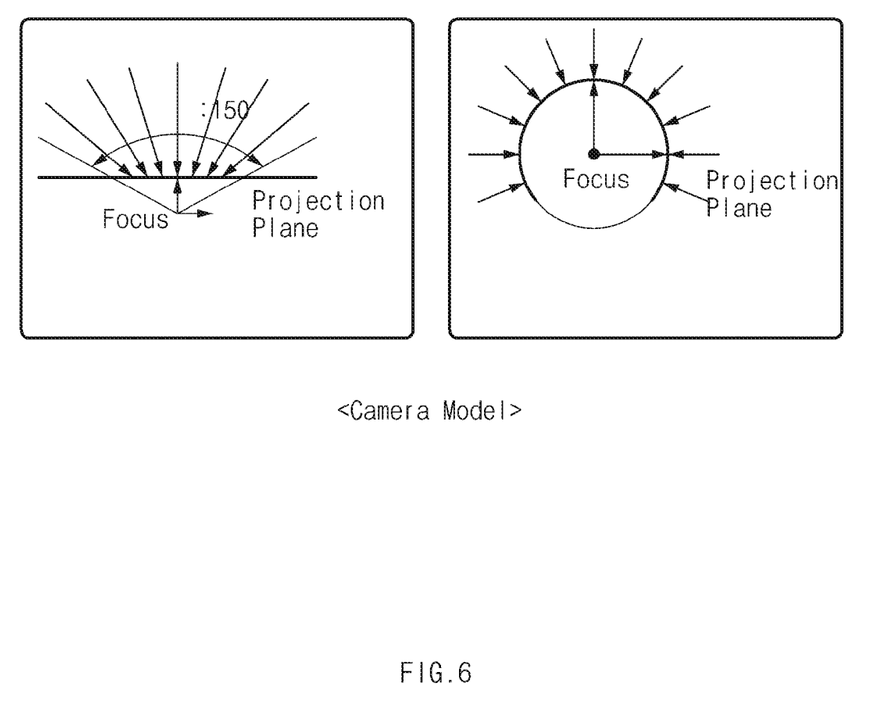
FIG. 6 is a diagram illustrating a projection model of a pin-hole type according to an exemplary embodiment of the present disclosure.

The image coordinate converter 140 calculates the world coordinate $P_w(W_x, W_y, W_z=0)$ of $P_f$ by applying the user input image coordinate $P_f(I_x, I_y)$ to a projection model of a pin-hole type (a camera model) as in FIG. 6, and $P_w(W_x, W_y, W_z=0)$ becomes the world coordinate of $P_f$ calculated in a state in which it is assumed that $P_c$ is an origin point.

The world coordinate of the input coordinate changed after the vehicle is moved is defined as $M_w(M_x, M_y, M_z=0)$, and the above-mentioned world coordinate may be calculated by adding a movement value of the vehicle to an initially set $P_w$.

As such, the image coordinate converter 140 calculates $P_w$, which is the world coordinate for the user input image coordinate, initializes the world coordinate $P_c$ of the vehicle, and then adds movement information (n) of the vehicle to each of the world coordinate for the user input image coordinate and the world coordinate of the vehicle, thereby calculating $M_{w+n}, P_{c+n}$. In this case, since the coordinate after $P_w$, which is the world coordinate for the user input image coordinate is moved is $M_w(M_x, M_y, M_z=0)$, the world coordinate for the user input image coordinate after the vehicle is moved as much as n becomes $M_{w+n}$. Here, n means the number of frames of a topview image.

The image coordinate converter 140 transfers the world coordinate $M_{w+n}, P_{c+n}$ after the movement of the vehicle to the vehicle position relationship tracker 160.

The vehicle movement information calculator 150 calculates vehicle movement information.

The vehicle position relationship tracker 160 tracks a vehicle position relationship using vehicle movement information according to the vehicle movement and region of interest information by the user input. That is, the vehicle position relationship tracker 160 performs the vehicle control by comparing a relative distance between the world coordinate $M_{w+n}$ of the user input image coordinate after the vehicle movement and the world coordinate $P_{c+n}$ of a changed position of the vehicle.

As such, the vehicle position relationship tracker 160 tracks a position relationship between the vehicle and the region of interest, and may perform a warning in the case in which there is a possibility that a collision might occur between the vehicle and the region of interest.

Figure 2:
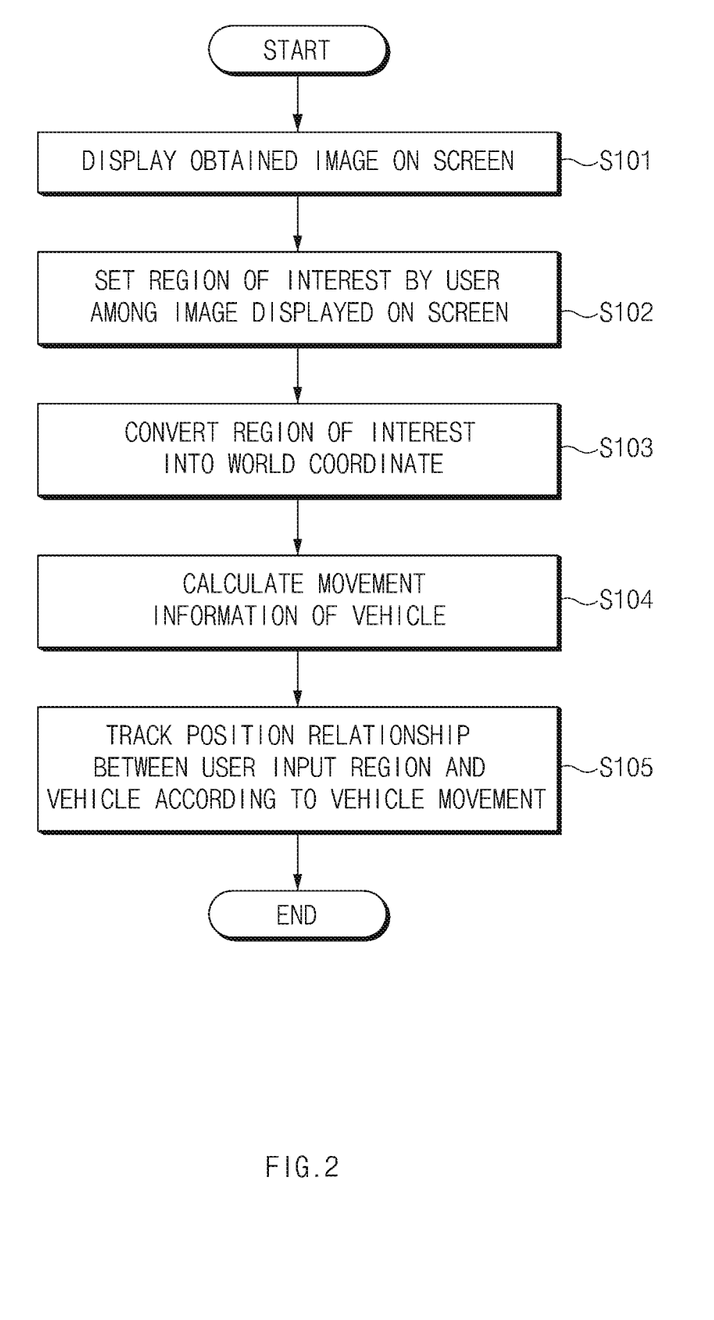
FIG. 2 is a flow chart illustrating a vehicle control method based on a user input according to an exemplary embodiment of the present disclosure.

Hereinafter, a vehicle control method based on a user input according to an exemplary embodiment of the present disclosure will be described in detail with reference to FIG. 2.

First, the image obtainer 110 obtains image data around a vehicle and the image synthesizer 120 synthesizes a plurality of image data (a front, a rear, a right, and a left), thereby displaying a synthesized image on a screen of the user information input device 130 (S101).

As a result, the user information input device 130 receives a region touched by a user among images displayed on the screen, as a region of interest (S102). In this case, the region of interest input by the user may be designated by a drag or a touch of a finger of the user as in FIGS. 3A, 3B, and 3C. In addition, the images displayed on the screen may include the image synthesized by the image synthesizer 120 or images which are obtained by the image obtainer 110 but are not synthesized.

The image coordinate converter 140 converts the region of interest designated by the finger of the user into a world coordinate (S103). In this case, when it is assumed that a user input image coordinate designated by the user is $P_f(I_x, I_y)$, a world coordinate of $P_f$ calculated by a camera model becomes $P_w(W_x, W_y, W_z=0)$. In this case, $P_c(C_x, C_y, C_z=0)$, which is a world coordinate of the vehicle is initialized.

Thereafter, the vehicle movement information calculator 150 calculates vehicle movement information (S104).

Thereafter, the image coordinate converter 140 adds the vehicle movement information to the world coordinate of the user input image coordinate and the world coordinate of a vehicle position, and transfers a world coordinate $W_{w+n}$ of the user input image coordinate after the vehicle movement and a world coordinate $P_{c+n}$ of the vehicle position after the vehicle movement to the vehicle position relationship tracker 160. The vehicle position relationship tracker 160 tracks a vehicle position relationship using vehicle movement information according to the vehicle movement and region of interest information by the user input. That is, the vehicle position relationship tracker 160 performs the vehicle control by comparing a relative distance between the world coordinate $M_{w+n}$ of the user input image coordinate after the vehicle movement and the world coordinate $P_{c+n}$ of a changed position of the vehicle (S105).

Figure 7:
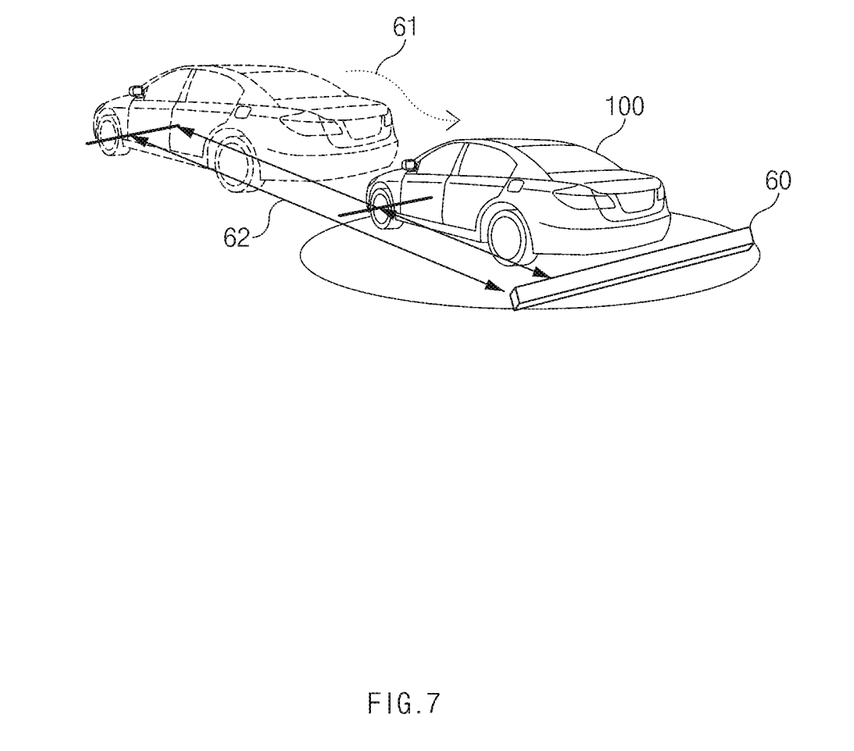
FIG. 7 is a diagram illustrating an example tracking a position relationship between a user input region and a vehicle in response to the movement of the vehicle according to an exemplary embodiment of the present disclosure.

FIG. 7 is a diagram illustrating an example tracking a position relationship between a user input region and a vehicle in response to the movement of the vehicle according to an exemplary embodiment of the present disclosure. Referring to FIG. 7, a virtual obstacle 60 is set by the user input, and the vehicle position relationship tracker 160 calculates a distance between a vehicle 100 and the virtual obstacle 60 after the movement 61. In addition, the vehicle position relationship tracker 160 may calculate a distance 62 with the virtual obstacle 60 according to the vehicle movement, thereby performing a collision warning.

Figure 4A:
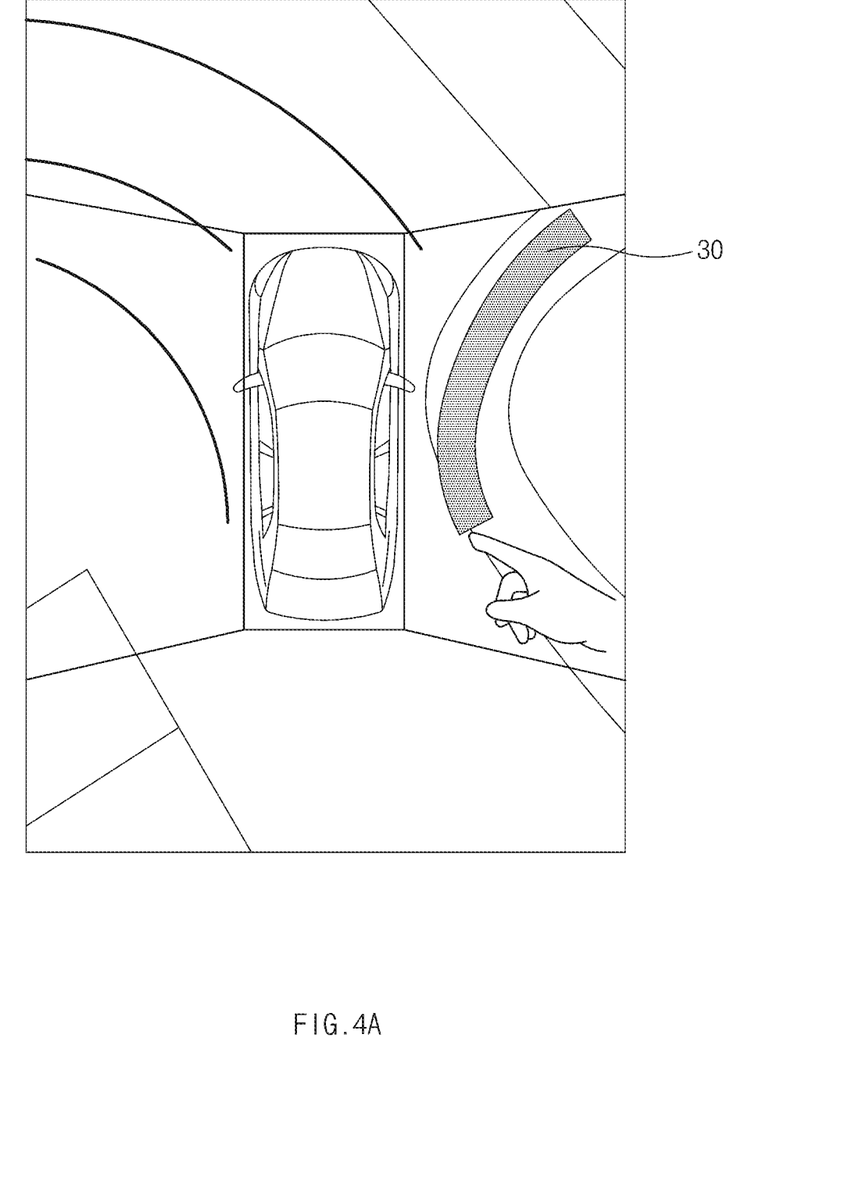
FIG. 4A is an illustrative view of a set screen of a region of interest through the user input when a vehicle is moved according to an exemplary embodiment of the present disclosure.
Figure 4B:
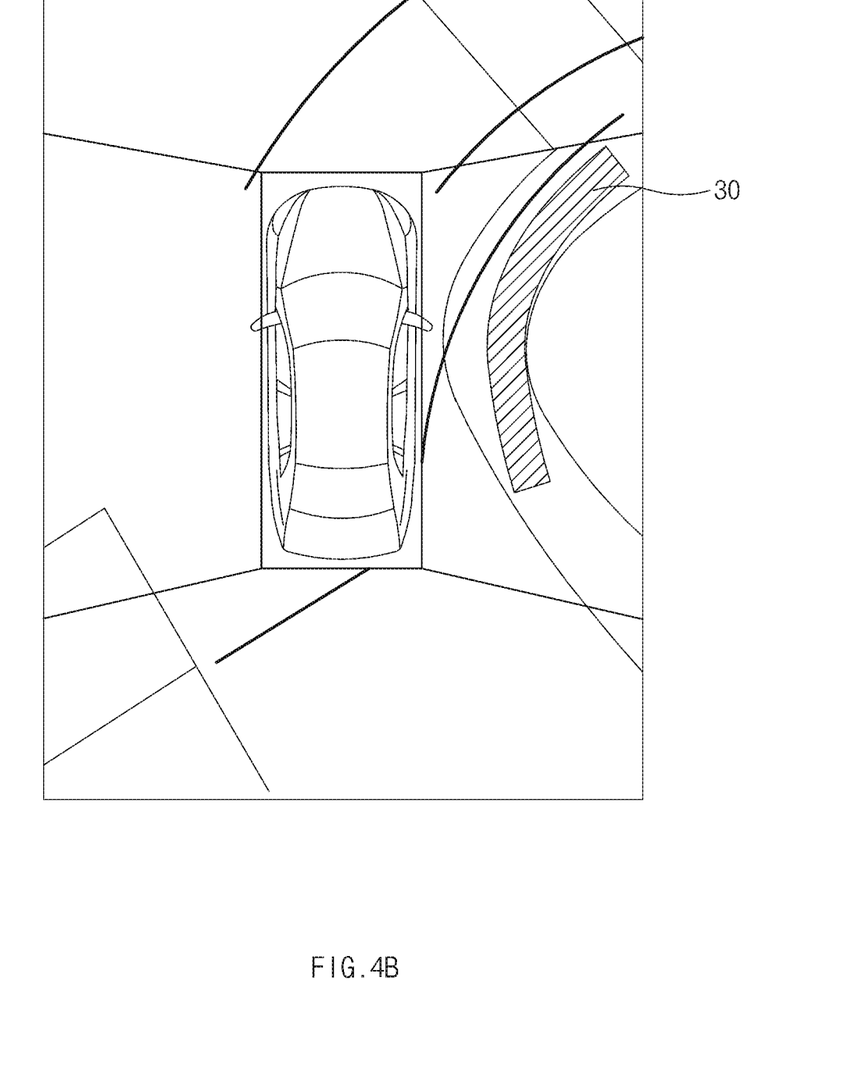
FIG. 4B is an illustrative view of performing the vehicle control by applying the setting of the region of interest of FIG. 4A.

FIG. 4A is an illustrative view of a set screen of a region of interest 30 through the user input when a vehicle is moved according to an exemplary embodiment of the present disclosure and FIG. 4B is an illustrative view of performing the vehicle control by applying the setting of the region of interest 30 of FIG. 4A.

As illustrated in FIG. 4A, in the case in which the case in which the obstacle is present in a reversing direction at the time of reversing the vehicle is confirmed from an image screen, if the user sets the region of interest by touching a region in which the obstacle is present by the hand, the vehicle position relationship tracker 160 performs a control of changing the reversing direction by considering the region of interest which is directly set by the user. As illustrated in FIG. 4B, it may be seen that a movement direction of the vehicle is varied by applying the region of interest of the user.

Figure 5:
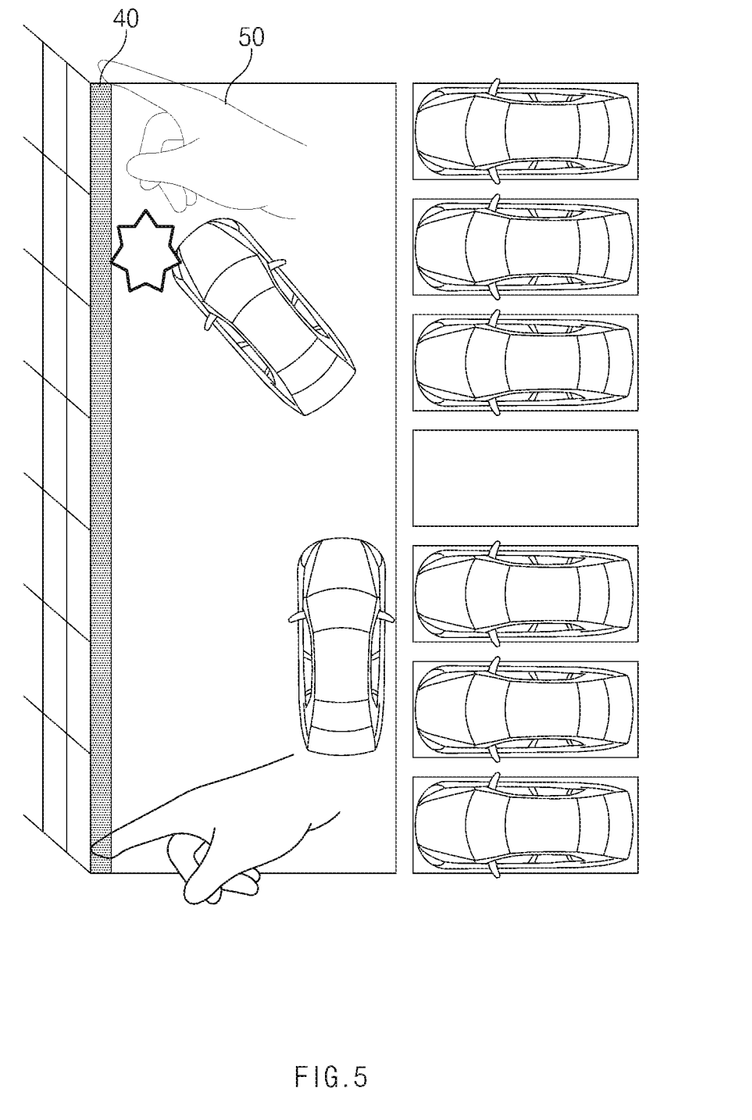
FIG. 5 is a diagram illustrating an example warning a collision risk by applying the region of interest set by the user input according to an exemplary embodiment of the present disclosure.

FIG. 5 is a diagram illustrating an example warning a collision risk by applying the region of interest set by the user input according to an exemplary embodiment of the present disclosure. Referring to FIG. 5, in the case in which a fence or a barbed-wire fence 50 which is difficult to be recognized by an ultrasonic sensor, or the like at the time of parking is present, the vehicle control may be performed so that a warning is issued at the time of the collision risk or the vehicle may be parked while avoiding the above-mentioned obstacle by setting the fence 40 or the barbed-wire fence 50 on the image screen through the touch or the drag of the user as the region of interest and setting the fence 40 or the barbed-wire fence 50 as the virtual obstacle.

Figure 8:
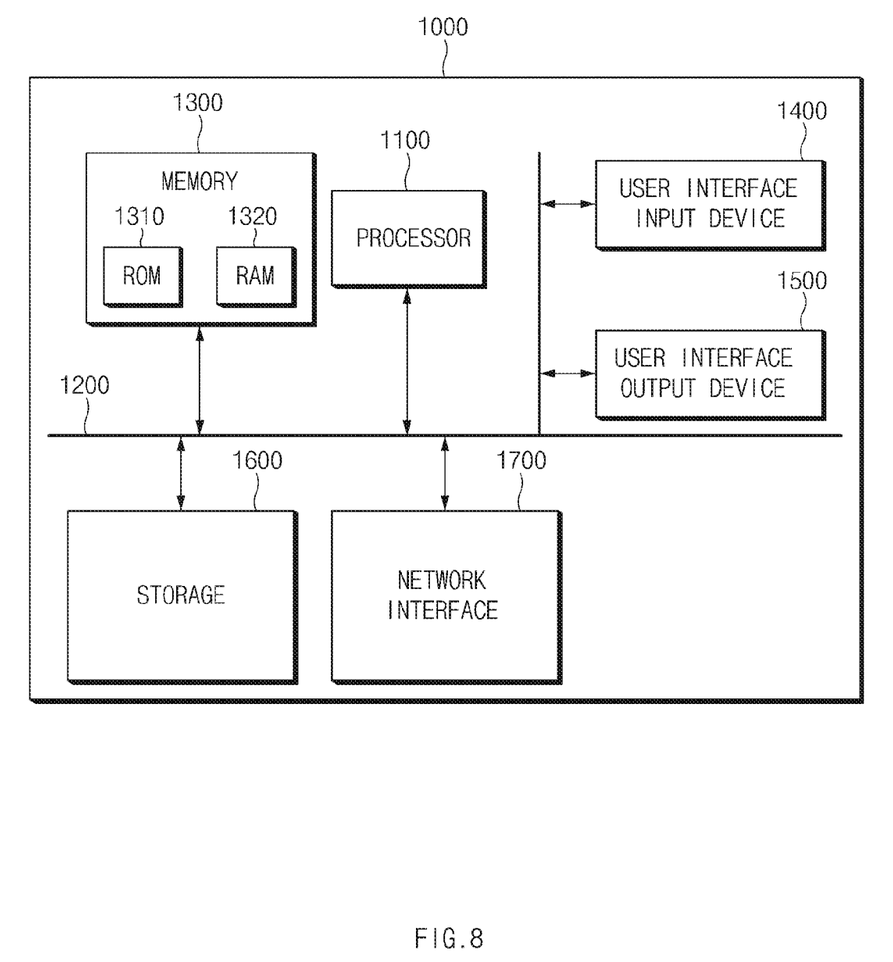
FIG. 8 is a configuration diagram of a computer system to implement a vehicle control technology based on a user input according to an exemplary embodiment of the present disclosure.

FIG. 8 is a configuration diagram of a computer system to implement a vehicle control technology based on a user input according to an exemplary embodiment of the present disclosure.

Referring to FIG. 8, a computing system 1000 may include at least one processor 1100, a memory 1300, a user interface input device 1400, a user interface output device 1500, a storage 1600, and a network interface 1700 which are connected through a bus 1200.

The processor 1100 may be a central processing unit (CPU) or a semiconductor device executing processes for instructions which are stored in the memory 1300 and/or the storage 1600. The memory 1300 and the storage 1600 may include various kinds of volatile or non-volatile storing media. For example, the memory 1300 may include a read only memory (ROM) and a random access memory (RAM).

Accordingly, steps in the method or algorithm and/or functions performed by various components described in connection with the exemplary embodiments disclosed in the present specification may be directly implemented in hardware, a software module, or a combination thereof which is executed by the processor 1100. The software module may be resided on a storing medium (i.e., the memory 1300 and/or the storage 1600) such as a random access memory (RAM) memory, a flash memory, a read only memory (ROM) memory, an erasable programmable read only memory (EPROM) memory, an electrically erasable programmable read only memory (EEPROM) memory, a register, a hard disk, a removable disk, or a compact disc-read only memory (CD-ROM).

An illustrative storing medium may be coupled to the processor 1100 and the processor 1100 may read information from the storing medium and write the information into the storing medium. Alternatively, the storing medium may also be integral with the processor 1100. The processor and the storing medium may also be resided within an application specific integrated circuit (ASIC). The ASIC may also be resided within a user terminal. Alternatively, the processor and the storing medium may also be resided within the user terminal as an individual component.

As described above, according to the exemplary embodiments of the present disclosure, the user directly inputs the information on the obstacles or the dangerous regions visually recognized by the user, and applies the information to the vehicle control, thereby making it possible to perform a safer vehicle control and to increase convenience of the user.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle control system based on a user input, the vehicle control system comprising:
   a sensor installed on a vehicle;
   a camera different from the sensor and installed on the vehicle;
   a user information input device including a screen displaying an image frame received from the camera, and receiving, by a touch of a user on the image frame displayed on the screen, a region of interest in the image frame, wherein the region of interest includes an image of an obstacle which is not sensed by the sensor and which is included in the image frame displayed on the screen;
   an image coordinate converter converting an image coordinate of the region of interest in the image frame into a world coordinate of a space;
   a vehicle movement information calculator calculating movement information of the vehicle; and
   a vehicle position relationship tracker controlling the vehicle based on the movement information of the vehicle and the world coordinate of the space.

2. The vehicle control system according to claim 1, wherein the image coordinate converter calculates a world coordinate for a position of the vehicle and a world coordinate of the region of interest after the vehicle is moved by adding the movement information of the vehicle to the world coordinate for the position of the vehicle and the world coordinate of the region of interest.

3. The vehicle control system according to claim 2, wherein the vehicle position relationship tracker controls the vehicle by comparing a relative distance between the world coordinate for the position of the vehicle and the world coordinate of the region of interest after the vehicle is moved.

4. The vehicle control system according to claim 3, wherein the vehicle position relationship tracker performs a control to avoid a collision between the vehicle and the region of interest.

5. The vehicle control system according to claim 1, further comprising an image synthesizer synthesizing front, rear, and side images of the vehicle from the image frame of the camera.

6. The vehicle control system according to claim 5, wherein the user information input device displays the image frame synthesized by the image synthesizer on the screen.

7. A vehicle control method based on a user input, the vehicle control method comprising:
   displaying an image frame around a vehicle on a screen;
   receiving a region of interest in the image frame, by a touch of a user on the image frame displayed on the screen, wherein the region of interest includes an obstacle which is not sensed by a sensor for sensing obstacles and which is included in the image frame displayed on the screen;
   converting an image coordinate of the region of interest in the image frame into a world coordinate of a space;
   calculating movement information of the vehicle; and
   controlling the vehicle based on the movement information of the vehicle and the world coordinate of the space.

8. The vehicle control method according to claim 7, wherein in the displaying of the image frame on the screen, front, rear, and side image data of the vehicle are synthesized and are displayed.

9. The vehicle control method according to claim 7, wherein the performing of the vehicle control by applying the region of interest includes:
   calculating movement information of the vehicle; and
   performing the vehicle control according to a distance between the region of interest and the vehicle by considering the movement information of the vehicle.

10. The vehicle control method according to claim 9, wherein the performing of the vehicle control by applying the region of interest further includes warning a collision by comparing a distance between the region of interest and the vehicle.

11. The vehicle control method according to claim 7, wherein the sensor is one of an ultrasonic sensor or a radar sensor.

12. The vehicle control system according to claim 1, wherein the sensor is one of an ultrasonic sensor or a radar sensor.

* * * * *